United States Patent
Chen et al.

(10) Patent No.: US 9,350,450 B2
(45) Date of Patent: May 24, 2016

(54) BIT LOADING FOR OPTICAL DISCRETE MULTI-TONE TRANSMISSION

(71) Applicant: Huawei Technologies Co., Ltd., Shenzhen (CN)

(72) Inventors: Chen Chen, Ottawa (CA); Mahdi Zamani, Ottawa (CA); Zhuhong Zhang, Ottawa (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 14/252,099

(22) Filed: Apr. 14, 2014

(65) Prior Publication Data
US 2015/0086215 A1   Mar. 26, 2015

Related U.S. Application Data

(60) Provisional application No. 61/881,086, filed on Sep. 23, 2013.

(51) Int. Cl.
*H04Q 7/20* (2006.01)
*H04B 7/00* (2006.01)
(Continued)

(52) U.S. Cl.
CPC ........ *H04B 10/2507* (2013.01); *H04B 10/2575* (2013.01); *H04B 10/40* (2013.01); *H04B 10/506* (2013.01); *H04B 10/516* (2013.01);*H04B10/541* (2013.01); *H04B 10/556* (2013.01); *H04B 10/697* (2013.01)

(58) Field of Classification Search
CPC ... H04B 10/506; H04B 10/516; H04B 10/697

USPC .................................. 398/136, 135
See application file for complete search history.

(56) References Cited

U.S. PATENT DOCUMENTS 7,277,512 B1 * 10/2007 Barsoum ............... H04B 15/06
                                                          370/208
2004/0001552 A1   1/2004 Koifman
(Continued)

FOREIGN PATENT DOCUMENTS

WO     2005094029 A1     10/2005

OTHER PUBLICATIONS

Gho, G.H. et al., "Rate-Adaptive Coding for Optical Fiber Transmission Systems," Journal of Lightwave Technology, vol. 29, No. 2, Jan. 15, 2011, 12 pages.
(Continued)

*Primary Examiner* — Oommen Jacob
(74) *Attorney, Agent, or Firm* — Slater Matsil, LLP

(57) ABSTRACT

System and method embodiments are provided for bit loading for optical Discrete Multi-Tone Transmission (DMT). In an embodiment, a method for bit loading for optical DMT transmission or reception includes receiving, at a processor, a bit data stream, wherein the bit data stream comprises a plurality of subcarriers; assigning, with the processor, a code rate to each of a plurality of forward error correction (FEC) encoders/decoders according to a mapping of a signal-to-noise-ratio (SNR) to a code rate for each of the subcarriers or subcarrier groups, wherein each FEC encoder/decoder corresponds to a respective one of the subcarriers or a respective subcarrier group; and assigning, with the processor, a modulation format to each subcarrier or each subcarrier group according to a mapping of an SNR for each subcarrier or subcarrier group to a bit number for a corresponding subcarrier or subcarrier group.

17 Claims, 13 Drawing Sheets

(51) Int. Cl.
*H04B 10/2507* (2013.01)
*H04B 10/40* (2013.01)
*H04B 10/50* (2013.01)
*H04B 10/516* (2013.01)
*H04B 10/69* (2013.01)
*H04B 10/2575* (2013.01)
*H04B 10/54* (2013.01)
*H04B 10/556* (2013.01)

(56) References Cited

U.S. PATENT DOCUMENTS

2005/0032514 A1* 2/2005 Sadri ............... H04W 52/346
455/423
2006/0146922 A1 7/2006 Modlin
2007/0147530 A1 6/2007 Li
2009/0161780 A1* 6/2009 Schneider ............. H04L 1/0003
375/260
2011/0286544 A1* 11/2011 Avudainayagam et al. .. 375/295
2015/0086215 A1* 3/2015 Chen et al. ................ 398/136

OTHER PUBLICATIONS

International Search Report and Written Opinion of the International Searching Authority received in Patent Cooperation Treaty Application No. PCT/CN2014/087064 mailed Dec. 24, 2014, 12 pages.

* cited by examiner

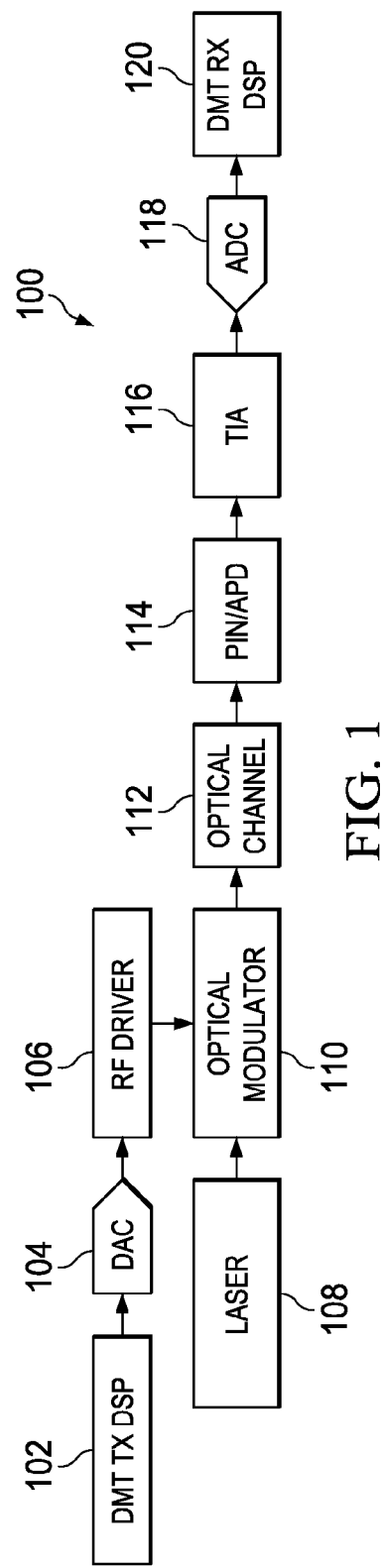
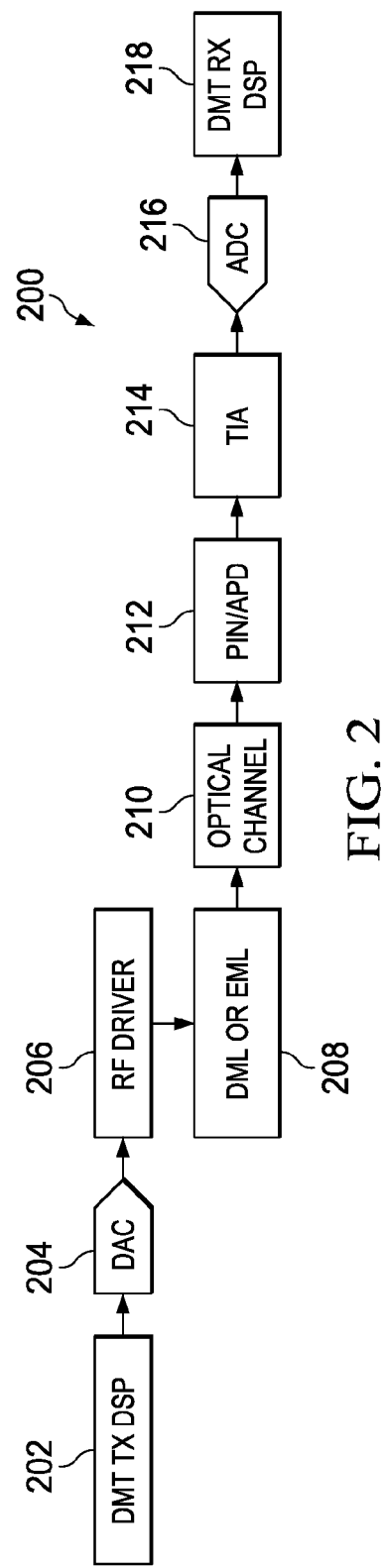
FIG. 1
FIG. 2

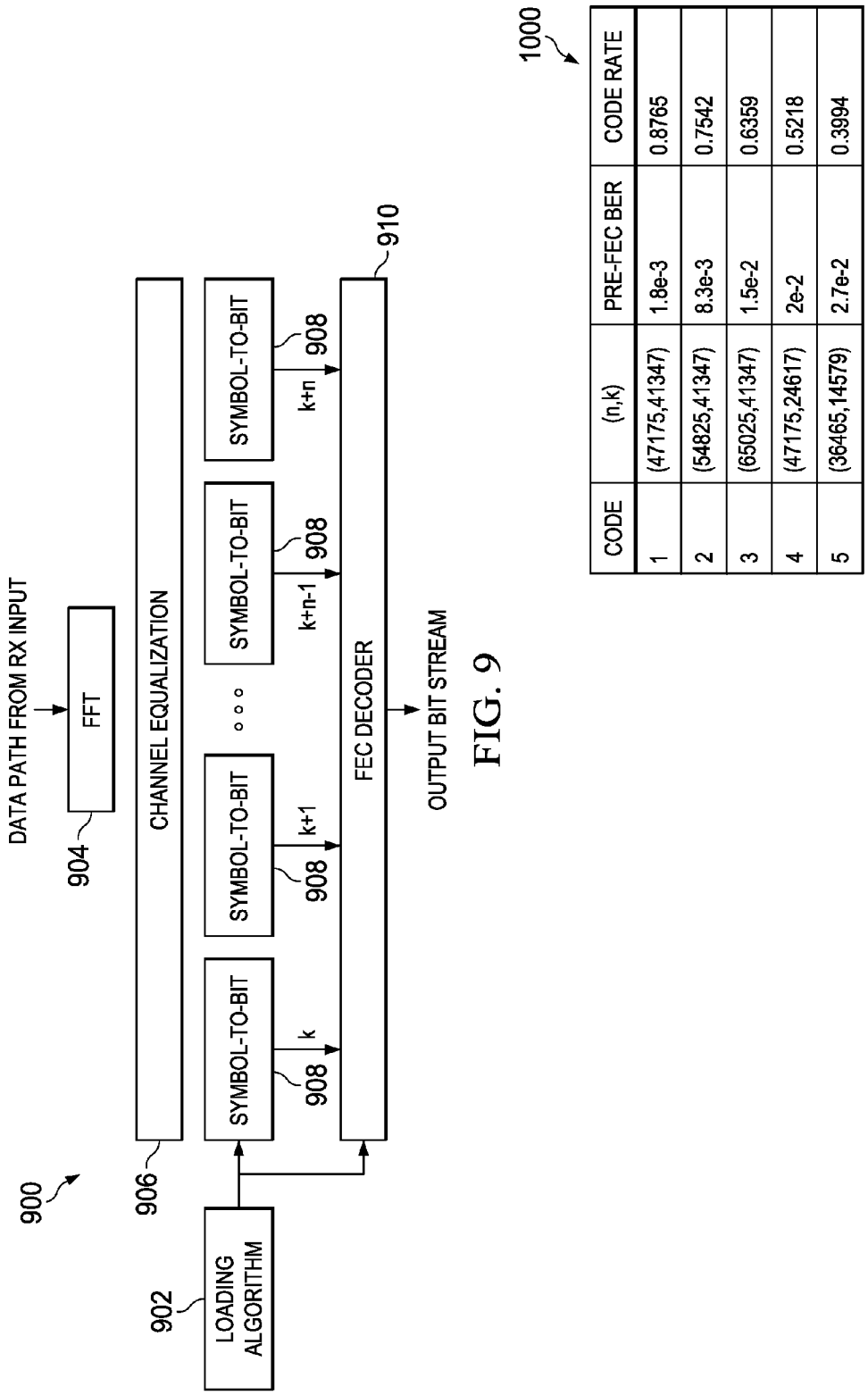

1600

| CODE | (n,k) | POST-FEC BER TARGET | PRE-FEC BER | CODE RATE | DATA RATE |
|---|---|---|---|---|---|
| 1 | (47175, 41347) | 1e-15 | 1.8e-3 | 0.8765 | 92.03Gbps |
| 2 | (54825, 41347) | 1e-15 | 8.3e-3 | 0.7542 | 93.52Gbps |
| 3 | (65025, 41347) | 1e-15 | 1.5e-2 | 0.6359 | 83.93Gbps |
| 4 | (47175, 24617) | 1e-15 | 2e-2 | 0.5218 | 73.05Gbps |
| 5 | (36465, 14579) | 1e-15 | 2.7e-2 | 0.3994 | 57.91Gbps |
| 6 | NLA | 1e-15 | n/a | 0.7928 (average) | 99.70Gbps |

BIT LOADING FOR OPTICAL DISCRETE MULTI-TONE TRANSMISSION

The present application claims the benefit of U.S. Provisional Patent Application No. 61/881,086 filed Sep. 23, 2013 and entitled "System and Method for Bit Loading for Optical DMT Transmission," which is incorporated herein by reference as if reproduced in its entirety.

TECHNICAL FIELD

The present invention relates to a system and method for optical communications, and, in particular embodiments, to a system and method for bit loading for optical discrete multi-tone transmission.

BACKGROUND

Optical discrete multi-tone (DMT) transmission has emerged as a promising solution to realize a high-capacity optical network. However, several optical and hardware impairments may alter the transmission channel significantly, which include chromatic dispersion (CD), polarization mode dispersion (PMD), electro-optics hardware amplitude and phase response, optical modulator chirp and nonlinearity, and signal-signal beating noise if direct detection is employed. There are generally two types of detection schemes, namely direct detection and coherent detection. Depending on the detection scheme, these impairments would impact the channel and subcarrier signal to noise ratio (SNR) differently. Therefore, water-filling is used to maximize the performance of optical DMT transmission by optimizing the bit and power loading for DMT subcarriers. There are two types of loading algorithms, rate adaptive (RA) and margin adaptive (MA). RA tries to maximize the bit rate for a given bit error rate (BER) target, while MA tries to minimize BER for a given bit rate. Because it is difficult to implement a non-integer bit in practice, the loading algorithms must deal with the so-called finite information granularity, rendering the resulting bit and power loading sub-optimal. For example, SNR is required to increase by ~3 dB to maintain the same BER for quadrature amplitude modulation (QAM) with one bit increment. So for subcarriers with SNRs within a 3 dB gap, the bit number needs to either round up or down to the closet integer, and the power profile needs to be adjusted accordingly. Some well-known loading algorithms such as Chow's and Levin-Campello algorithms can provide both RA and MA solutions, but they only deal with bit and power loading.

SUMMARY

In accordance with an embodiment, a method for bit loading for optical discrete multi-tone (DMT) transmission or reception includes receiving, at a processor, a bit data stream, wherein the bit data stream comprises a plurality of subcarriers; assigning, with the processor, a code rate to each of a plurality of forward error correction (FEC) encoders/decoders according to a mapping of a signal-to-noise-ratio (SNR) to a code rate for each of the subcarriers or subcarrier groups, wherein each FEC encoder/decoder corresponds to a respective one of the subcarriers or a respective subcarrier group; and assigning, with the processor, a modulation format to each subcarrier or each subcarrier group according to a mapping of an SNR for each subcarrier or subcarrier group to a bit number for a corresponding subcarrier or subcarrier group.

In accordance with an embodiment, a network component configured for bit loading for optical discrete multi-tone (DMT) transmission or reception includes a processor and a computer readable storage medium storing programming for execution by the processor, the programming including instructions to: receive a bit data stream, wherein the bit data stream comprises a plurality of subcarriers; assign a code rate to each of a plurality of forward error correction (FEC) encoders/decoders according to a mapping of a signal-to-noise-ratio (SNR) to a code rate for each of the subcarriers or subcarrier groups, wherein each FEC encoder/decoder corresponds to a respective one of the subcarriers or a respective subcarrier group; and assign a modulation format to each subcarrier or each subcarrier group according to a mapping of an SNR for each subcarrier or subcarrier group to a bit number for a corresponding subcarrier or subcarrier group.

In accordance with an embodiment, a method for bit loading for optical discrete multi-tone (DMT) transmission or reception includes receiving a plurality of data bits comprising a plurality of subcarriers; mapping a signal-to-noise-ratio (SNR) to a modulation format and a code rate for each subcarrier or group of subcarriers; performing forward error correction (FEC) on each subcarrier or group of subcarriers according to the code rate corresponding to the subcarrier or group of subcarriers; and jointly optimizing a bit number, code rate, and power for each subcarrier or group of subcarriers according to the SNR for the corresponding subcarrier or group of subcarriers and according to the modulation format.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates a schematic of a an embodiment directly-detected optical DMT transmission system;

FIG. 2 illustrates directly-detected optical DMT transmission system using DML or EML;

FIG. 9 illustrates a DMT RX data path using the conventional bit loading algorithm;

FIG. 10 illustrates an embodiment table for mapping SNR to code rates for NLA;

DETAILED DESCRIPTION OF ILLUSTRATIVE EMBODIMENTS

Figure 3:
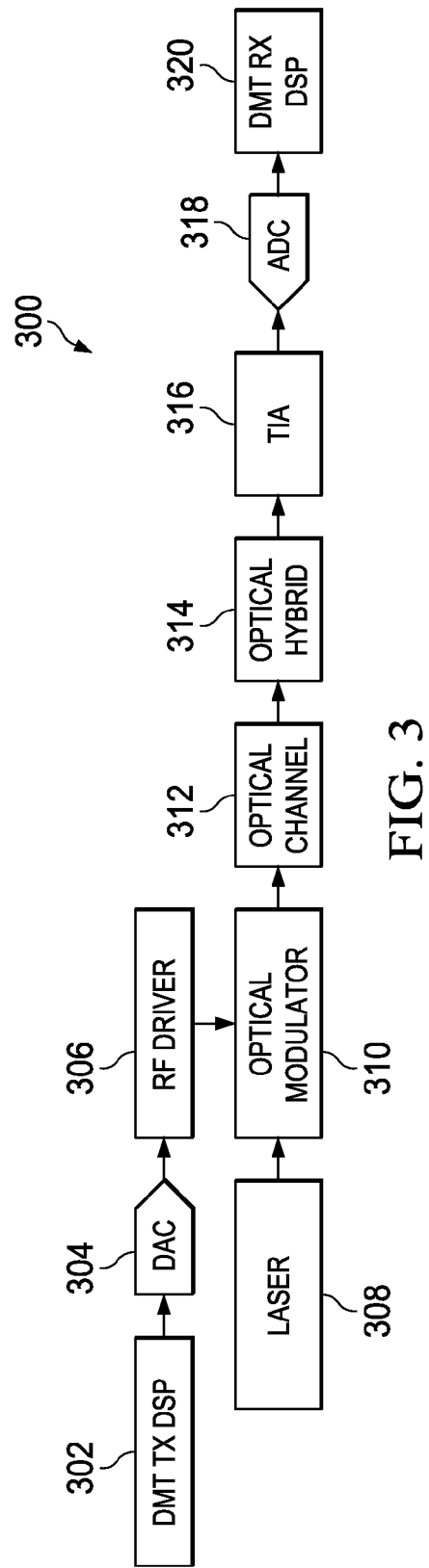
FIG. 3 illustrates a schematic diagram of a coherently-detected optical DMT transmission system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for a loading algorithm for optical DMT transmission. The disclosed loading algorithm incorporates rate adaptive forward error correction (FEC) and provides a joint optimization of bit (i.e., modulation format), power, and code rates based on the subcarrier signal-to-noise-ratio (SNR) of a discrete multi-tone (DMT) system. One key to embodiments of the disclosed loading algorithm is mapping SNR to bit number (i.e., modulation format) and to code rate. In an embodiment, the mapping is implemented using tabulation (i.e., tables). In an embodiment, a loading primer is disclosed as well as methods and systems for both rate-adaptive (RA) and margin-adaptive (MA) solutions.

Disclosed herein is a method for bit loading for optical discrete multi-tone (DMT) transmission or reception includes receiving, at a processor, a bit data stream, wherein the bit data stream comprises a plurality of subcarriers; assigning, with the processor, a code rate to each of a plurality of forward error correction (FEC) encoders/decoders according to a mapping of a signal-to-noise-ratio (SNR) to a code rate for each of the subcarriers or subcarrier groups, wherein each FEC encoder/decoder corresponds to a respective one of the subcarriers or a respective subcarrier group; and assigning, with the processor, a modulation format to each subcarrier or each subcarrier group according to a mapping of an SNR for each subcarrier or subcarrier group to a bit number for a corresponding subcarrier or subcarrier group. In another embodiment, a method for bit loading for optical discrete multi-tone (DMT) transmission or reception includes receiving a plurality of data bits comprising a plurality of subcarriers; mapping a signal-to-noise-ratio (SNR) to a modulation format and a code rate for each subcarrier or group of subcarriers; performing forward error correction (FEC) on each subcarrier or group of subcarriers according to the code rate corresponding to the subcarrier or group of subcarriers; and jointly optimizing a bit number, code rate, and power for each subcarrier or group of subcarriers according to the SNR for the corresponding subcarrier or group of subcarriers and according to the modulation format.

In an embodiment, the code rates for at least two of the FEC encoder/decoders are different. In an embodiment, the code rates for all of the FEC encoder/decoders are different. In an embodiment, a loading primer includes sorting the subcarriers; iteratively calculating an average SNR for each subcarrier, selecting the code rate and the modulation format for each subcarrier according to a lookup table, and determining a sum of a total number of bits for each subcarrier until the total number of bits determined in an iteration is greater than or equal to the total number of bits determined in a previous iteration; and unsorting the subcarriers.

In an embodiment, following executing a loading primer, a rate-adaptive (RA) solution to the loading algorithm is determined by quantizing, for each subcarrier, an SNR to a nearest SNR value in an a loading algorithm tabulation table; obtaining a corresponding bit number and code rate for each subcarrier according to the tabulation table; scaling, for each subcarrier, a subcarrier power by a ratio of the SNR before quantization to the SNR after quantization; determining a total power sum over all the subcarriers after quantizing the SNR; and scaling each subcarrier power by a constant such that the total power before quantizing the SNR is substantially equal to the total power after quantizing the SNR.

In an embodiment, following executing a loading primer, a margin-adaptive (MA) solution to a loading algorithm is determined by determining a margin between a data rate provide by the loading primer and a target fixed rate; scaling, for each subcarrier, the SNR by the margin; quantizing, for each subcarrier, the SNR to a nearest SNR value in a loading algorithm tabulation; obtaining a corresponding bit number and code rate for each subcarrier or subcarrier group according to the loading algorithm tabulation; determining a total power summing over all subcarriers after quantizing the SNR when an updated data rate is substantially equal to a target data rate; and scaling each subcarrier power by a constant such that the total power before quantizing the SNR is substantially equal to the total power after quantizing the SNR. In an embodiment, each subcarrier is requantized when the updated data rate is not substantially equal to the target data rate before scaling each subcarrier power by a constant such that the total power before quantizing the SNR is substantially equal to the total power after quantizing the SNR.

Water-filling is used to maximize the performance of discrete multi-tone (DMT) systems by optimizing bit and power loading. In an optical DMT system, the transmission channel is impacted significantly by chromatic dispersion (CD), polarization mode dispersion (PMD), electro-optics hardware amplitude and phase response, optical modulator chirp and nonlinearity, and signal-signal beating noise if direct detection is employed. As a result, significant SNR variation may occur across DMT subcarriers.

As used herein, the term NLA (i.e., new loading algorithm) is used to denote the disclosed loading algorithms, systems, and methods and the term CLA (i.e., conventional loading algorithm) is used to denote conventional loading algorithms.

An embodiment NLA improves performance of optical DMT transmission. NLA incorporates an adaptive rate forward error correction (FEC) into bit loading. NLA assigns a code rate to the FEC encoder/decoder while it assigns a modulation format to individual subcarriers and/or subcarrier groups simultaneously. NLA improves water-filling performance by reducing information granularity.

An embodiment NLA incorporates rate adaptive FEC, and provides a joint optimization of bit (e.g., modulation format), power and code rate based on the subcarrier SNR of a DMT system. NLA maps from SNR to bit number (e.g., modulation format) and code rate (e.g., the modulation and code rate product). One straightforward implementation of this mapping is to use tabulation. Embodiment algorithms for the loading primer as well as for both RA and MA solutions are provided herein.

An embodiment improves transmission capacity or BER of an optical DMT system. An embodiment enables a higher transmission capacity for a fixed BER target, or a lower BER for a fixed capacity target. An embodiment loading algorithm provides a joint optimization of bit (e.g., modulation format), power and FEC rate according to the subcarrier SNR of an optical DMT system. An embodiment improves transmission capacity or reduces BER of an optical DMT system. Embodiments may be implemented in 100G, 400G and beyond optical access and transmission, such as for optical DMT systems.

FIG. 1 illustrates a schematic of a an embodiment directly-detected optical DMT transmission system 100. System 100 includes a DMT TX digital signal processor (DSP) 102, a digital to analog converter (DAC) 104, a radio-frequency (RF) driver 106, a laser 108, an optical modulator 110, an optical channel component 112, a p-type, intrinsic, n-type diode (PIN)/avalanche photodiode (APD) 114, a transimpedance amplifier (TIA) 116, an analog to digital convertor (ADC) 118, and a DMT RS DSP 120. The components of system 100 may be arranged as shown in FIG. 1. An optical modulator 110 is used to convert the electrical DMT signal to an optical carrier. In an embodiment, the optical modulator 110 may be a dual-parallel Mach-Zehnder (DPMZ), a dual-drive MZ (DDMZ), or an electro-absorption modulator (EAM). A PIN or avalanche photodiode (APD) (i.e., PIN/APD 114) is used to convert the optical DMT signal back to the electrical domain. Direct detection using PIN or APD is a square law process, which may introduce higher-order distortion to the DMT signal and thus impact the SNR of DMT subcarriers. Also under direct detection, chromatic dispersion (CD), polarization mode dispersion (PMD), and optical modulator chirp may interact to produce frequency dependence channel fading, which significantly alters the SNR of DMT subcarriers.

FIG. 2 shows another embodiment directly-detected optical DMT system 200 using directly-modulated laser (DML) or externally-modulated laser (EML), so the separate optical modulator is not needed for further hardware simplification and cost reduction. System 200 includes a DMT TX DSP 202, a DAC 204, an RF deriver 206, a DML or EML component 208, an optical channel component 210, a PIN/APD 212, a TIA 214, an ADC 216, and a DMT RX DSP 218. The components of system 200 may be arranged as shown in FIG. 2. FIGS. 1 and 2 reflect a single-wavelength channel only, but the embodiment bit loading systems and methods are not limited to single-wavelength channel application, and may be used with multiple wavelengths.

FIG. 3 illustrates a schematic diagram of a coherently-detected optical DMT transmission system 300. System 300 includes a DMT TX DSP 302, a DAC 304, an RF driver 306, a laser 308, an optical modulator 310, an optical channel component 312, an optical hybrid 314, a TIA 316, an ADC 318, and a DMT RX DSP 320. The components of system 300 may be arranged as shown in FIG. 3. In contrast to system 100, an optical hybrid 314 is used in system 300 instead of PIN/APD. Multiple analog-to-digital converter (ADC) and digital-to-analog converter (DAC) channels may be used to carry the in-phase and quadrature-phase signals as well as the polarization multiplexed signals. Though CD and PMD impact on channel SNR may not be as significant as that under direct detection, electro-optics hardware impairment (such as IQ delay, IQ imbalance, quadrature angle offset, etc.) would still impact the SNR of DMT subcarriers. The schematic only represents a high-level description. Multiple channels of ADC, DAC, RF drivers, and transimpedance amplifier (TIA) can be used for the in-phase and quadrature signals as well as polarization-multiplexed signals. Several optical and hardware impairments would alter the channel characteristics and thus subcarrier SNR significantly. These impairments can include CD, PMD, hardware filter response, modulator and/or laser nonlinearities, signal-signal beating interference and so forth. The degree of impact varies with actual implementation.

Figure 4:
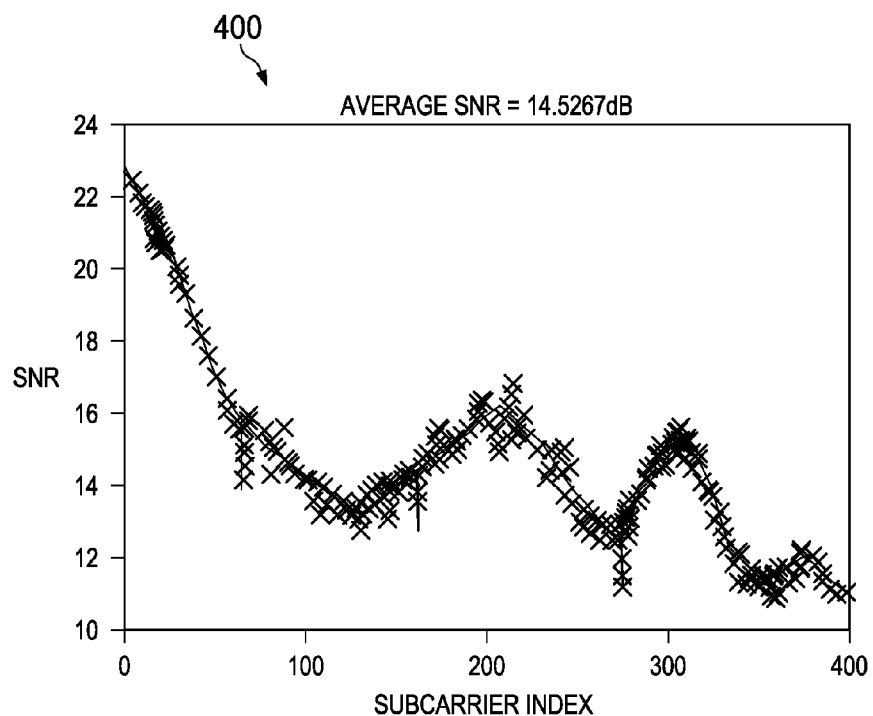
FIG. 4 illustrates a graph of example measured SNR versus DMT subcarriers for a directly-detected optical DMT transmission after 40 km of G.652 single mode optical fiber.
Figure 5:
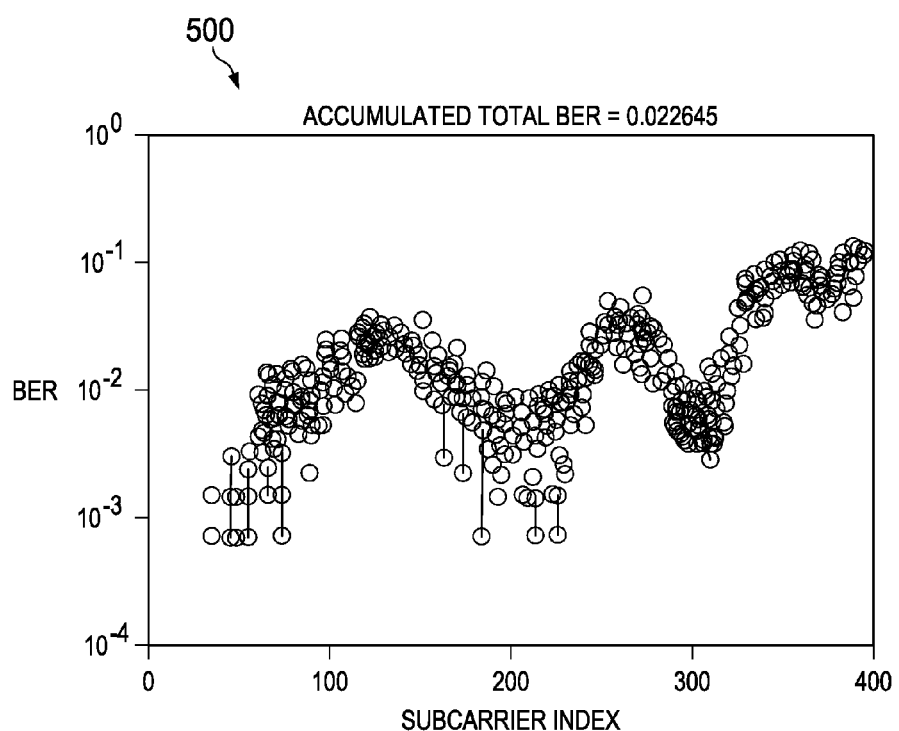
FIG. 5 illustrates a graph of example measured of BER versus DMT subcarriers for a directly-detected optical DMT transmission after 40 km of G.652 single mode optical fiber.

FIG. 4 illustrates a graph 400 of example SNR versus DMT subcarriers for a directly-detected optical DMT transmission after 40 km of G.652 single mode optical fiber. FIG. 5 illustrates a graph 500 of examples of BER versus DMT subcarriers for a directly-detected optical DMT transmission after 40 km of G.652 single mode optical fiber. CD and modulator nonlinearity interaction cause ripples in SNR and BER, and significantly impact system performance if water-filling is not employed.

Figure 6:
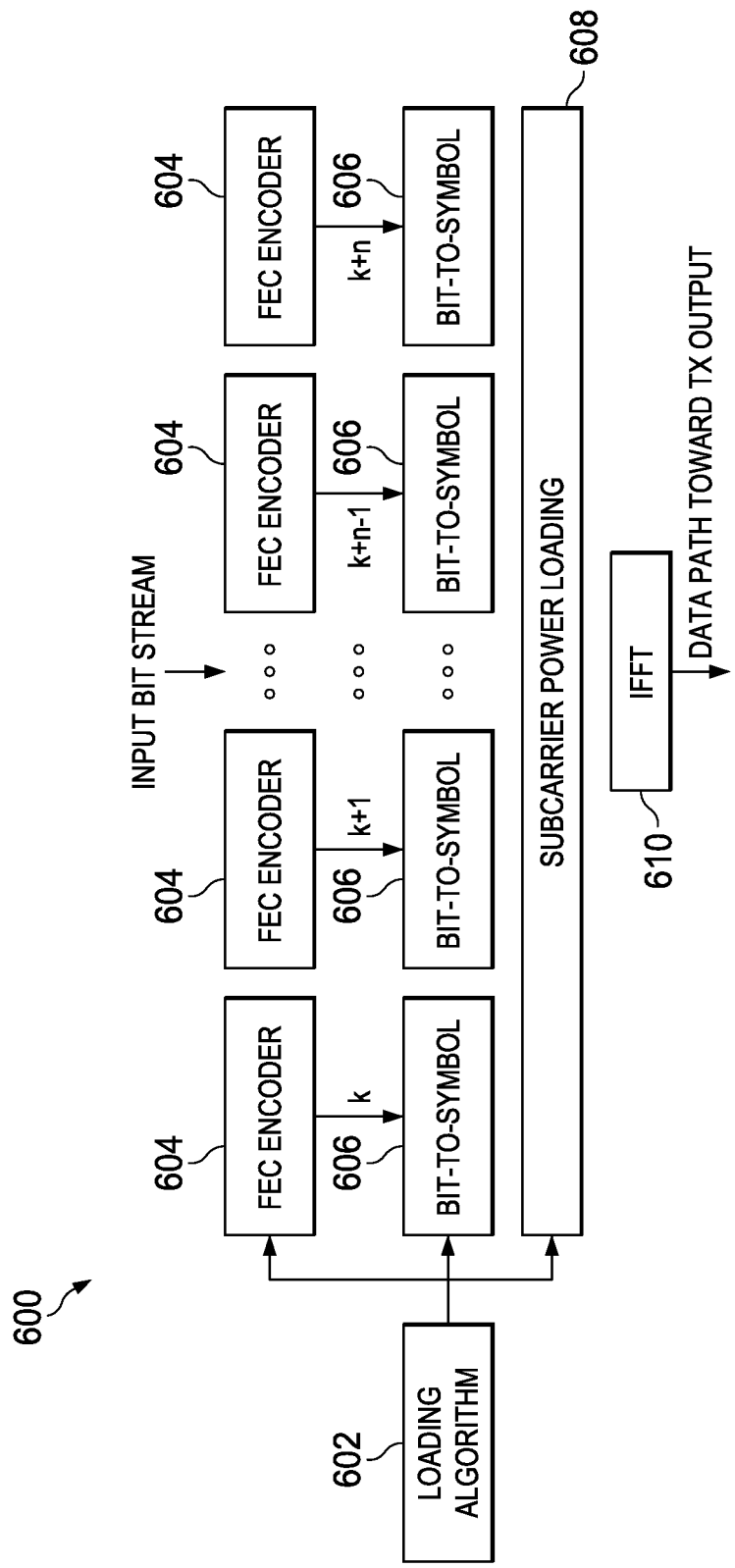
FIG. 6 is a schematic diagram of a TX data path of an embodiment system for NLA for DMT TX.
Figure 7:
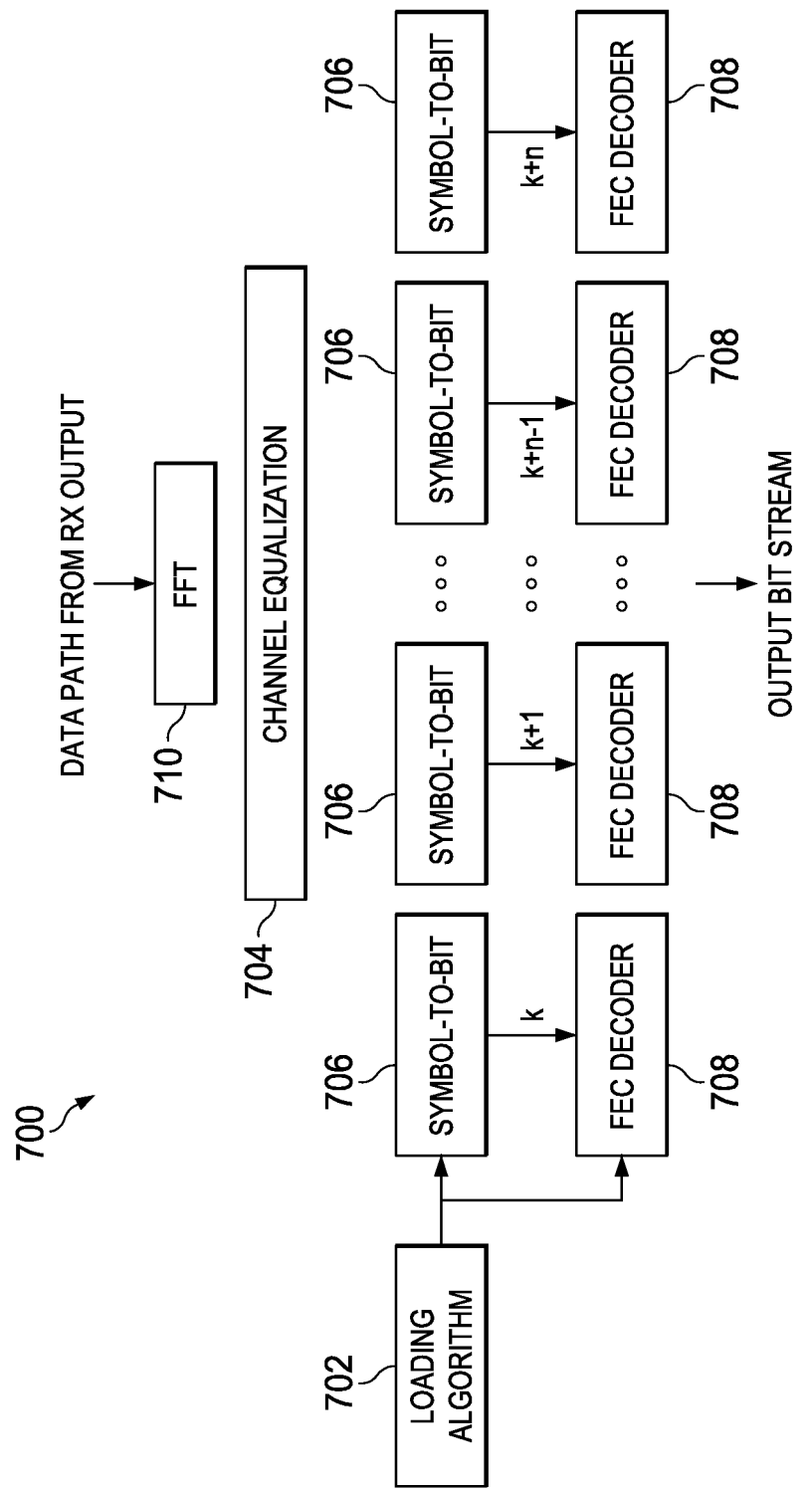
FIG. 7 is a schematic diagram of a RX data path of an embodiment system for NLA for DMT TX.
Figure 8:
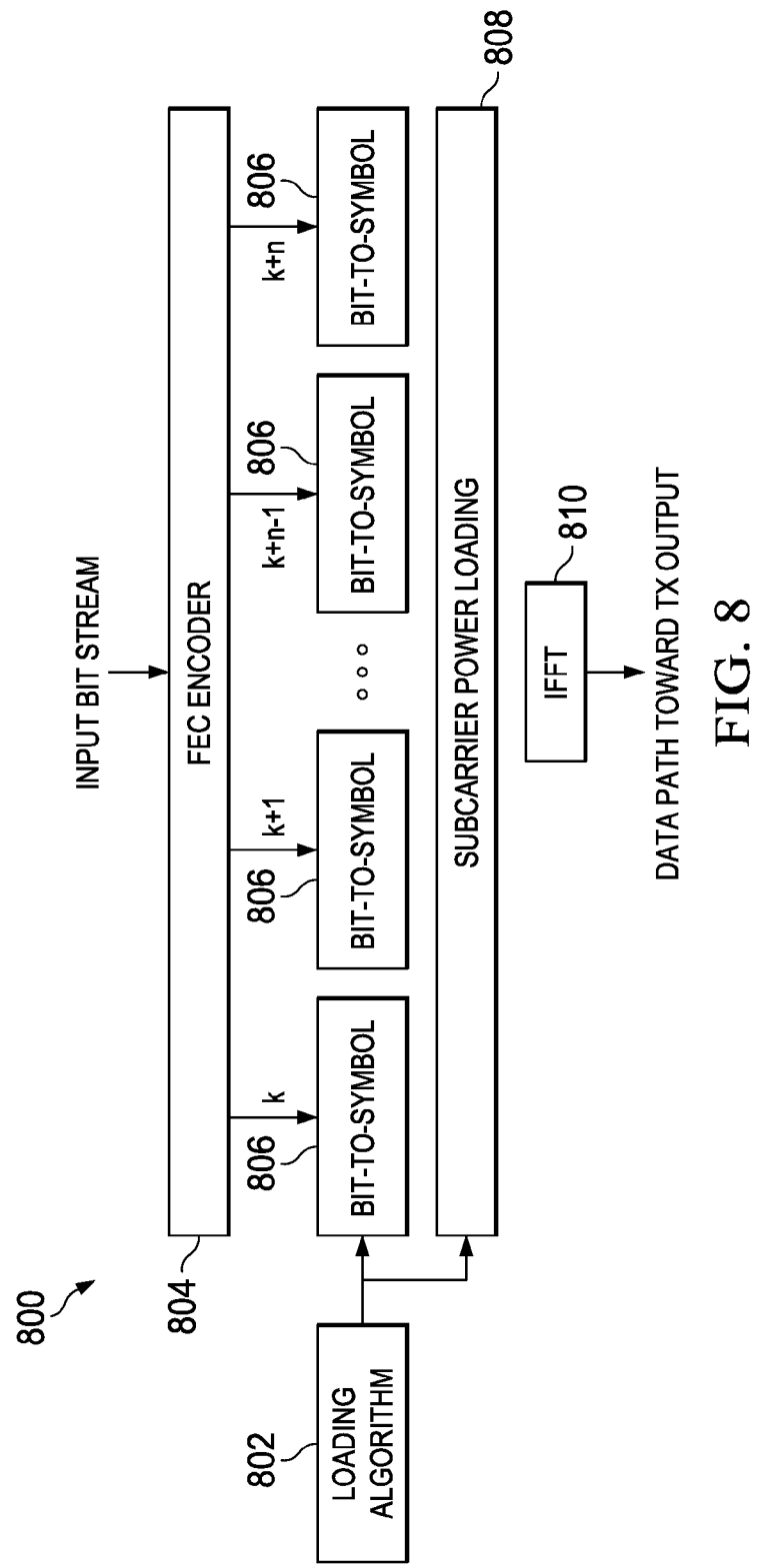
FIG. 8 is a schematic diagram of a conventional system 800 for DMT TX.

An embodiment new loading algorithm (NLA) is presented in the following to improve water-filling performance. FIGS. 6 and 7 illustrate the TX and RX data paths associated with NLA, respectively. In comparison, FIGS. 8 and 9 depict the data path associated with the conventional loading algorithm (CLA) for DMT TX and RX, respectively. When CLA is used, the FEC encoder/decoder stays the same for all subcarriers. In actual ASIC implementation of CLA, individual subcarriers and/or subcarrier groups may also use the dedicated FEC encoder/decoder as shown in FIGS. 6 and 7, but the same FEC is used for all subcarriers. NLA, in contrast, uses different codes for each subcarrier and/or subcarrier group, so individual dedicated FEC encoders/decoders are used.

FIG. 6 is a schematic diagram of a TX data path of an embodiment system 600 for NLA for DMT TX. System 600 includes a loading algorithm 602 (e.g., NLA), a plurality of FEC encoders 604, a plurality of bit-to-symbol encoders 606, a subcarrier power loading module 608, and an inverse fast Fourier transform (IFFT) module. Each subcarrier (or subcarrier group) has its own FEC encoder 604 and two, several, or all of the FEC encoders may be different from the other FEC encoders 604. The loading algorithm 602 provides each FEC encoder 604 with a code rate corresponding to the associated subcarrier (or subcarrier group). The loading algorithm also provides a bit-to-symbol (e.g., modulation format or bit number) for each bit-to-symbol encoders 606 corresponding to an associated subcarrier (or subcarrier group). The individual subcarriers that make up the input bit stream are each delivered to a corresponding one of the FEC encoders 604. After FEC encoding and bit-to-symbol encoding, subcarrier power loading is performed on the subcarriers by the subcarrier power loading module 608. After power loading, the IFFT module 610 performs an IFFT on the subcarriers and the data is forwarded toward the TX output.

FIG. 7 is a schematic diagram of a RX data path of an embodiment system 700 for NLA for DMT TX. System 700 includes a loading algorithm 702 (e.g., NLA), a fast Fourier transform (FFT) unit 710, a channel equalization component 704, a plurality of symbol-to-bit decoders 706, and a plurality of FEC decoders 708. Data bits from the RX input are received by the FFT component 710 which performs an FFT on the data which is then sent to the channel equalization component 704. After passing through the channel equalization component 704, each subcarrier (or subcarrier group) is sent to a corresponding symbol-to-bit decoder 706 and then to an FEC decoder 708. The symbol-to-bit decoders 706 and FEC decoders 708 decode the subcarriers using modulation formats and code rates provided by the loading algorithm 702. After decoding the subcarriers (or subcarrier groups), the output bit stream is forwarded on to other components in the DMT TX system.

FIG. 8 is a schematic diagram of a conventional system 800 for DMT TX. System 800 includes a loading algorithm 802 (e.g., CLA), a single FEC encoder 804, a plurality of bit-to-symbol encoders 806, a subcarrier power loading module 808, and an IFFT module 810. Each subcarrier has the same FEC encoding performed on it in system 800.

FIG. 9 is a schematic diagram of a conventional system 900 for DMT RX. System 900 includes an FFT module 904, a channel equalization component 906, a plurality of symbol-to-bit decoders 908, and a single FEC decoder 910. Data traverses through the components of system 900 as shown in FIG. 9. Each subcarrier has the same FEC decoding performed on it in system 900.

It can be seen from FIGS. 6-9 that NLA determines the code rate, modulation and subcarrier power according to the subcarrier SNR. The subcarrier SNR can be acquired during either system startup or normal operation, and is made available to TX. In addition to SNR, the code rates are pre-selected with NLA. FIG. 10 illustrates an embodiment table 1000 for mapping SNR to code rates. For illustration purposes only, 5 code rates are assumed in Table 1000 of FIG. 10 and 7 QAM modulation formats can be used for NLA. These 5 codes easily can be made by puncturing or shortening a single convolution code for instance. Pre-FEC BER for each code is determined so that post-FEC BER of 2e-15 is achieved.

Figure 11:
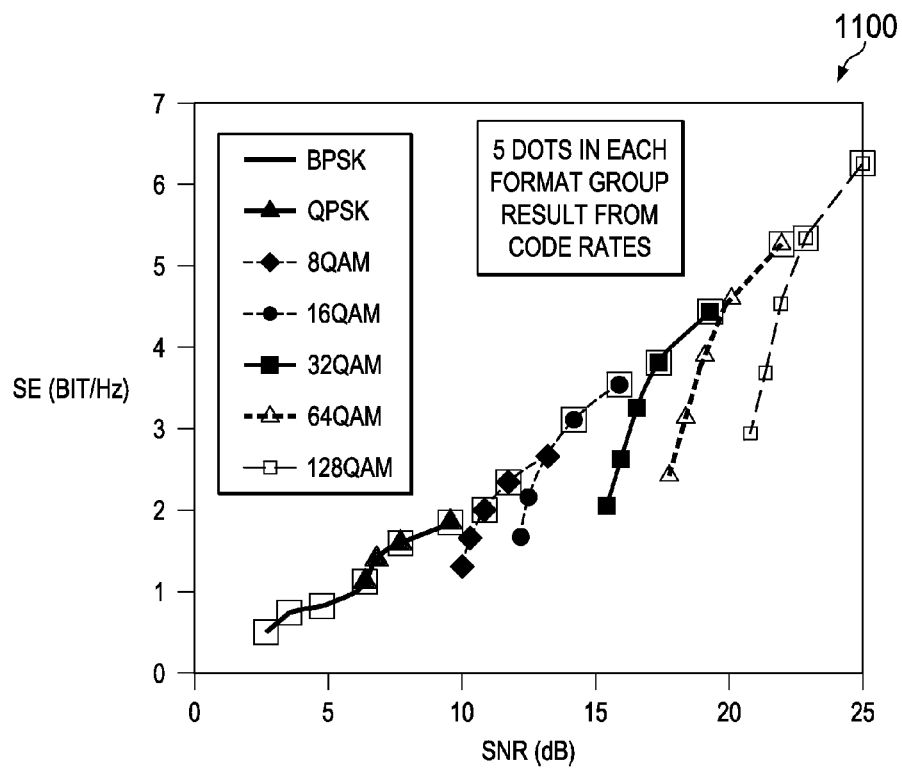
FIG. 11 illustrates bit and code rate product versus SNR where each modulation format has five available code rates.
Figure 12:
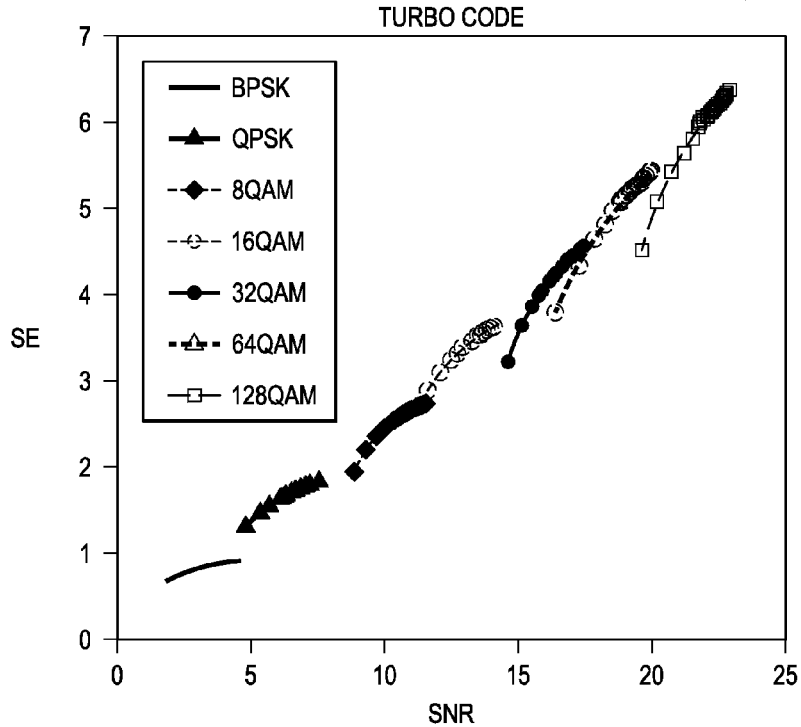
FIG. 12 illustrates bit and code rate product versus SNR where each modulation formats has fifteen available code rates.

One straightforward implementation of the functional $f$ is to use tabulation. In order to determine the tabulation entries, the code rates and pre-FEC BER are known. FIG. 11 is a graph 1100 illustrating bit and code rate product versus SNR, and shows an example tabulation that links bit number (defined by SE here) and SNR. For each modulation format, five code rates are used, resulting in a smaller effective bit granularity. With 35 bit and code rate combinations, not all of them are useful due to SNR overlap. Therefore, the useful combinations are selected (shown by squares), which can be done either online or offline depending on the specific implementation. It can be seen that the incremental SNR is much smaller than 3 dB. FIG. 12 is a graph 1200 of SE versus SNR that shows that an even smaller granularity can be achieved when 15 code rates are pre-selected.

Figure 13:
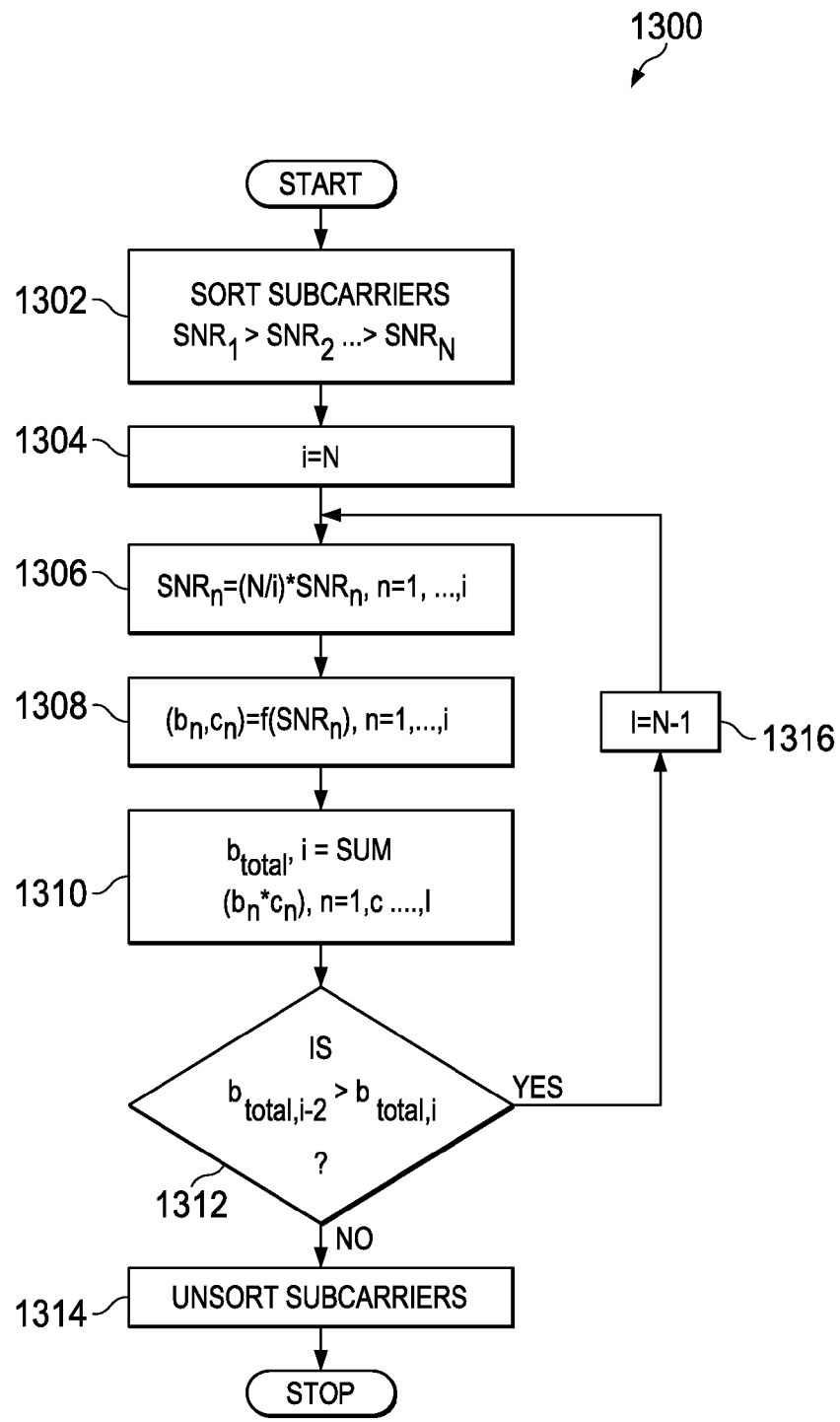
FIG. 13 shows an embodiment method for the NLA loading primer for NLA.

Like CLA, NLA can also provide rate-adaptive (RA) and margin-adaptive (MA) solutions. Both RA and MA solutions can begin with a loading primer. FIG. 13 shows an embodiment method 1300 for the NLA loading primer for NLA. The method 1300 begins at block 1302 where the processor sorts the subcarriers by SNR from greatest to smallest. At block 1304, the processor sets an iteration value, i, to equal N, where N is a fast Fourier transform (FFT) size used in OFDM receiver, and begins an iteration loop. At block 1306, the processor calculates the SNR for each subcarrier, n, according to $SNR_n=(N/i)*SNR_n$, n=1, . . . , i where $SNR_n$ is the SNR for the nth subcarrier, i is an OFDM subcarrier index, and N is the FFT size used in the OFDM receiver. At block 1308, the processor selects a code rate and modulator format (i.e., bit number) for each subcarrier using, for example, a lookup table according to, for example, $(b_n, c_n)=f(SNR_n)$, n=1, . . . , i, where $b_n$ is the bit number (i.e., modulation mode) for the nth subcarrier, $c_n$ is the code rate for the nth subcarrier, and $f$ is a functional form of a table mapping SNR to code rate and bit number. At block 1310, the processor calculates the total number of bits according to $b_{total,i}=Sum(b_n*c_n)$, n=1, . . . , i. At block 1312, the processor determines whether the total number of bits in the current iteration is greater than a previous iteration according to $b_{total,i-1}>b_{total,i}$, where $b_{total,i-1}$ is the sum of the total number of bits obtained in a current iteration and $b_{total,i}$ is the sum of the total number of bits obtained in a previous iteration. If, at block 1312, $b_{total,i-1}>b_{total,i}$, then the method 1300 proceeds to block 1316 where the processor decreases the iteration number by 1 and then proceeds to block 1306. If at block 1312, $b_{total,i-1}>b_{total,i}$ is not true, then the method 1300 proceeds to block 1314 where the processor unsorts the subcarriers, after which, the method 1300 ends. One component of NLA is to decide the functional $f$ that links SNR and bit number (e.g., code rate and modulation). Differently from Chow's on/off loading primer, at block 1308, the processor maps SNR to both the code rate and number of bits. In contrast, CLA primer only maps SNR to the number of bits, which can be readily done with the well-known SNR-capacity relationship. In FIG. 13 the mapping from SNR to code rate and bit is represented in a functional form $f$. One straightforward implementation of this function is to use tabulation. As described previously, the pre-selected code rates and pre-FEC BER's are two components to produce the function $f$ or tabulation.

Figure 14:
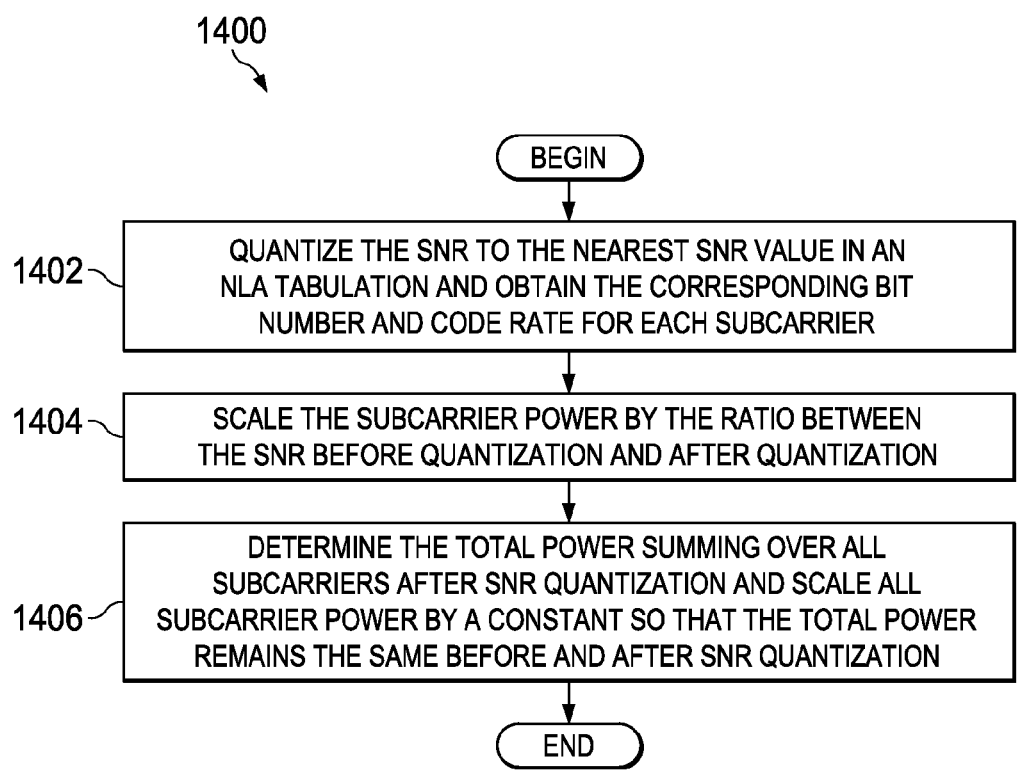
FIG. 14 is a flowchart of an embodiment method for determining an RA solution to the NLA.

FIG. 14 is a flowchart of an embodiment method 1400 for determining an RA solution to the NLA. The RA method 1400 executes the following steps after the NLA primer. The RA method 1400 begins at block 1402 where, for each subcarrier, a processor quantizes the SNR to the nearest SNR values in an NLA tabulation, and obtains the corresponding bit number and code rate. At block 1404, the processor scales the subcarrier power by the ratio between the SNR before and after quantization. At block 1406, the processor computes the total power summing over all subcarriers after SNR quantization, and then scale all subcarrier power by a constant, so that the total power remains the same before and after SNR quantization, after which, the method 1400 ends.

Figure 15:
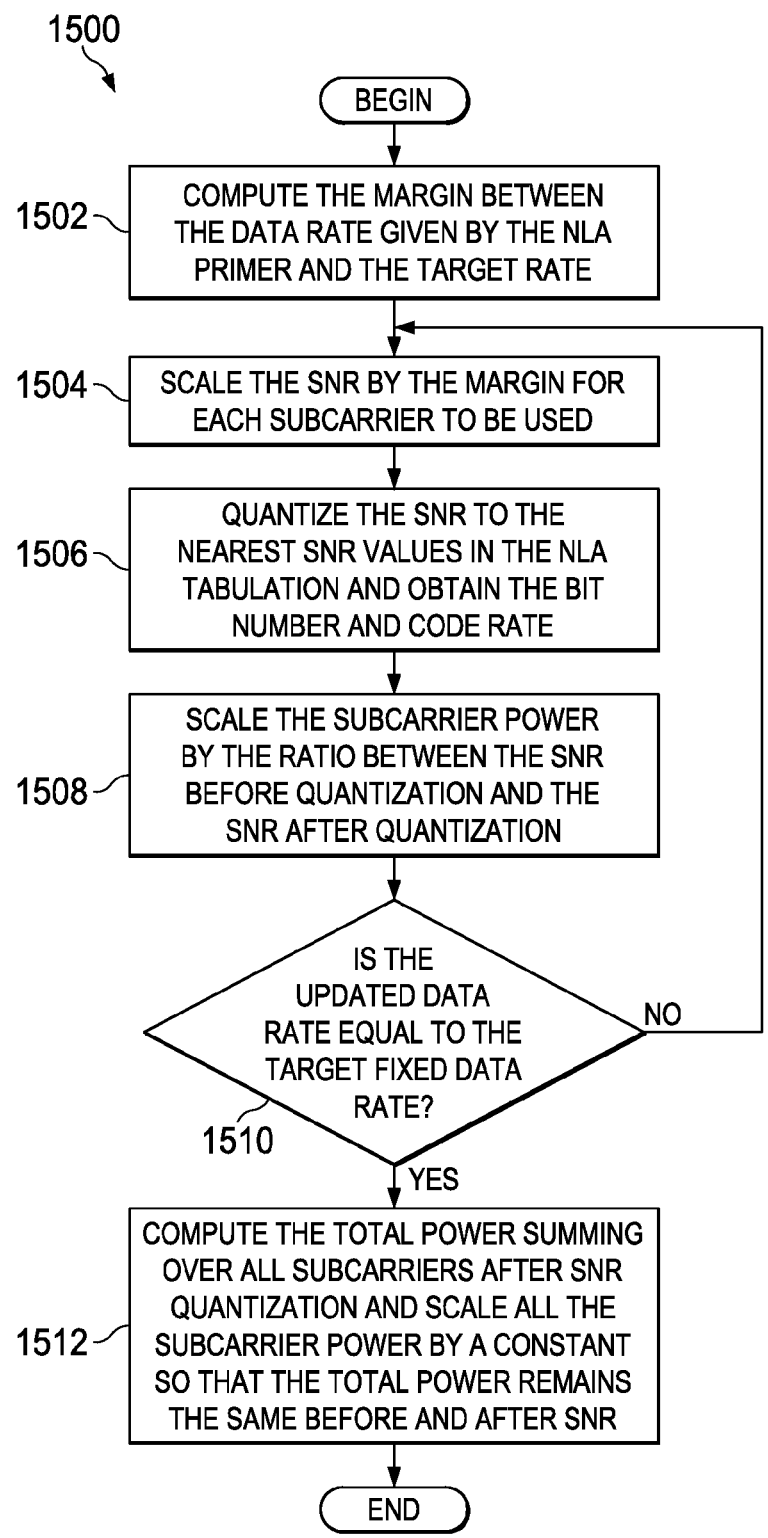
FIG. 15 is a flowchart of an embodiment method for determining an MA solution to the NLA.

FIG. 15 is a flowchart of an embodiment method 1500 for determining an MA solution to the NLA. The MA method 1500 executes the following steps after NLA primer. At block 1502, the processor computes the margin between the data rate given by the NLA primer b, and the target fixed rate, $\bar{b}$. The margin is given by $\gamma=b/\bar{b}$. At block 1504, for each subcarrier to be used, the processor scales the SNR by the margin $\gamma$. Next, at block 1506, the processor quantizes the SNR to the nearest SNR values in NLA tabulation, and obtains the corresponding bit number, $b_n$, and code rate, $c_n$. At block 1508, the processor scales the subcarrier power by the ratio between the SNR before and after quantization.

At block 1510, the processor checks whether the updated data rate, $b=\Sigma b_n \cdot c_n$, is equal to the target fixed data rate, $\bar{b}$. If, at block 1510, the updated data rate is equal to the target fixed data rate, then the method 1500 proceeds to block 1512. If not, then the method 1500 proceeds to block 1504 and the processor selects the subcarriers that are quantized in block 1504 quantizes (or requantizes) the subcarriers in another manner until the data rate is correct, and then re-scales the subcarrier power by the ratio between the SNR before and after quantization.

At block 1512, the processor computes the total power summing over all subcarriers after SNR quantization, and then scale all subcarrier power by a constant, so that the total power remains the same before and after SNR quantization, after which, the method 1500 ends.

Two well-known conventional loading algorithms for water-filling are Chow's and Levin-Camepllo algorithms. Both algorithms provide RA and MA solutions. The conventional loading algorithms provide the bit and power loading solution. None of them, however, are involved with adaptive rate FEC. Also, their performance is limited by the finite information granularity. An embodiment loading algorithm provides joint optimization of modulation, power and FEC code rates. It significantly reduces the information granularity, and improves the water-filling performance compared to the conventional loading algorithms. An embodiment loading algorithm can also provide RA and MA solutions.

Figure 16:
FIG. 16 illustrates a table listing five code rates for NLA.

Table 1600 in FIG. 16 provides a simulation example to show the performance benefit using NLA over CLA. The simulation is based on a 100G optical DMT system. The same five code rates in Table 1 are used here for comparison purposes. We use the NLA RA algorithm to maximize the capacity of a DMT system for a fixed post-FEC BER. It can be seen from Table 1600, that NLA using adaptive rate and modulation scheme (last row) leads to the largest data rate compared to CLA using a single code. Table 1600 illustrates the relative performance gain with and without using NLA. The absolute performance gain can be achieved with a more powerful FEC.

Figure 17:
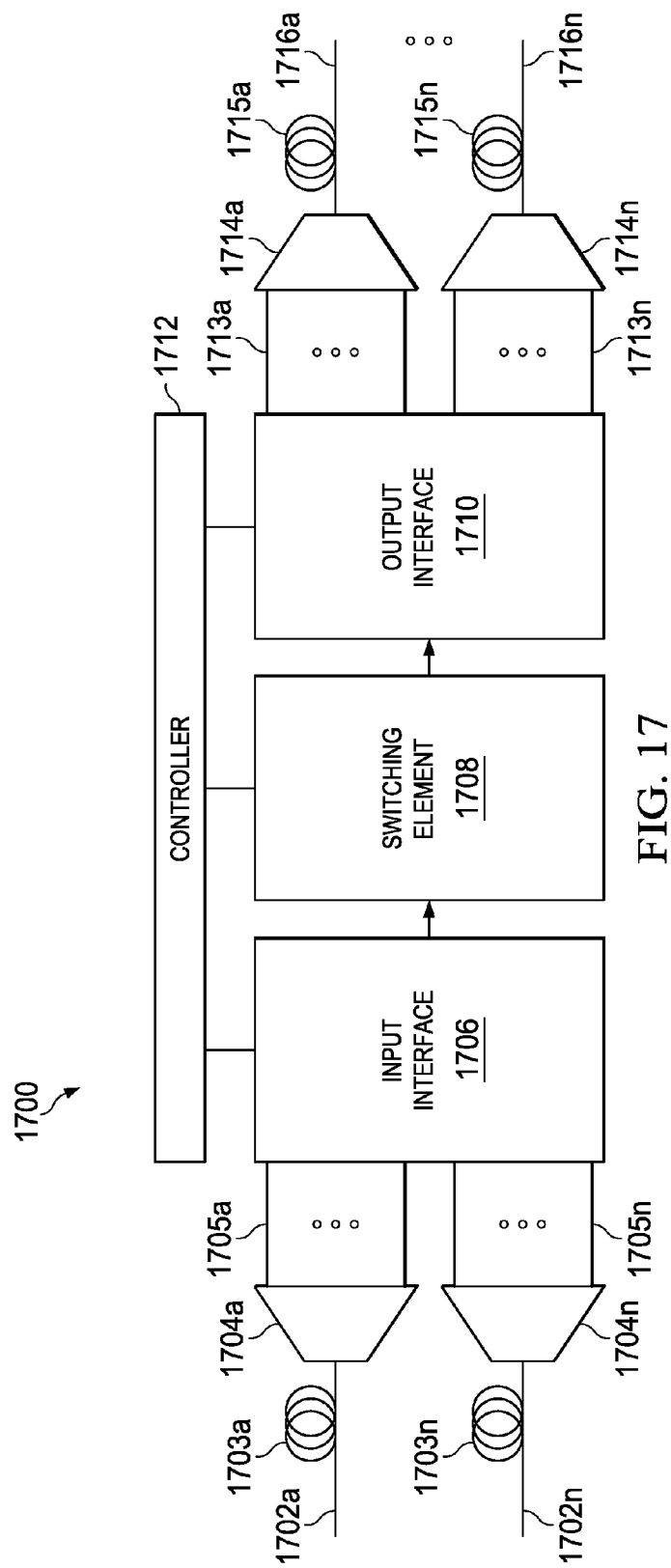
FIG. 17 is a block diagram of an embodiment optical data router.

FIG. 17 is a block diagram of an embodiment optical data router 1700. Optical data router 1700 may be used for implementing the devices and methods disclosed herein. Specific devices may utilize all of the components shown, or only a subset of the components and levels of integration may vary from device to device. Furthermore, a device may contain multiple instances of a component. Router 1700 includes one or more separators 1704, an input interface 1706, a switching element 1708, an output interface 1710, a controller 1712, and one or more combiners 1714. Each separator 1704 is configured to separate an input optical signal 1703 communicated over a communication link 1702. Separator 1704 may comprise, for example, a wavelength division demultiplexer. As used throughout this document, the phrases "wavelength division multiplexer" and "wavelength division demultiplexer" may include any optical and/or electrical components—including any hardware, software, and/or firmware—capable of processing wavelength division multiplexed signals and/or dense wavelength division multiplexed signals. In an embodiment, the input interface 1706, switching element 1708, and/or output interface 1710 include a PIC that incorporates the disclosed thermo-optic switches with thermally isolated and heat restricting pillars.

Communication link 1702 may include, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication link 1702 is configured to couple router 1700 to other optical and/or electro-optical components. For example, link 1702 could couple router 1700 to a cross-connect or another device operable to terminate, switch, route, process, and/or provide access to and/or from communication link 1702 and another communication link or communication device. As used throughout this document, the term "couple" and or "coupled" refers to any direct or indirect communication between two or more elements, whether or not those elements are physically connected to one another. In some embodiments, communication link 1702 can comprise a point-to-point communication link or a portion of a larger communication network, such as a ring network, a mesh network, a star network, or other network configuration.

Optical signal 1703 may include a multiple wavelength optical signal. For example, optical signal 1703 can include at least 5 wavelength channels, at least 100 wavelength channels, or at least 250 wavelength channels. In one particular embodiment, optical signal 1703 includes 250 wavelengths having a 50 gigahertz (GHz) spacing within a 100 nanometer (nm) spectral window. In that example, the 100 nm spectral window can be located within the 1700 nm to 1650 nm low-loss window associated with optical fibers. In various embodiments, optical signal 1703 can implement one or more data formats, such as, polarization shift keying (PLSK), pulse position modulation (PPM), Multi-Protocol Label Swapping (MPLS), Generalized Multi-Protocol Label Swapping (GMPLS), non-return to zero (NRZ), return to zero (RZ), differential phase shift key (DPSK), or a combination of these or other format types.

In an embodiment, separator 1704 is configured or operates to separate optical signal 1703 into individual wavelength channels 1705 and to couple each wavelength channel 1705 to an input interface 1706. In an alternative embodiment, separator 1704 can separate optical signal 1703 into separate multiple-wavelength channels and couple those multiple-wavelength channels to input interface 1706. Wavelength channels 1705 can comprise, for example, Internet Protocol (IP) packets, voice data, video data, or any other data type and/or data format. In this particular embodiment, each wavelength channel 1705 implements a frame format that comprises one or more framing bits, a first packet label that precedes a packet data, and a second packet label that follows the packet data. Surrounding a packet data with packet labels advantageously allows for relatively simple error checking at a destination associated with each wavelength channel 1705, however this format is not required. In this example, each wavelength channel 1705 implements a Generalized Multi-Protocol Label Swapping (GMPLS) routing protocol within the first and second packet labels. Although this example implements a GMPLS routing protocol, other routing protocols or data formats may be used without departing from the scope of the present disclosure.

In an embodiment, input interface 1706 is configured to receive and process each wavelength channel 1705 associated with optical signal 1703. Input interface 1706 can comprise any optical and/or electrical components—including any hardware, software, and/or firmware—capable of processing, converting, replicating, updating, and/or swapping one or more packet labels associated with each wavelength channel 1705. In various embodiments, input interface 1706 can determine a desired routing for a packet data associated with each wavelength channel 1705 and can update a first and/or second packet label using an all-optical label swapping technique. The phrase "all-optical" refers to the performance of a desired functionality substantially free from optical-to-electrical or electrical-to-optical conversions. The "all-optical" functionality does not prohibit optical-to-electrical or electrical-to-optical conversions for use by control circuitry that contributes to the overall function of the device. For example, input interface 1706 may include a controller that receives an electrical representation of a packet label and generates a control signal that functions to modulate a swapping sequence on an optical signal.

Switching element 1708 is configured to process one or more packet data associated with wavelength channels 1705 received from input interface 1706 and directing those packet data to a desired destination. Switching element 1708 can include any optical and/or electrical components—including any hardware, software, and/or firmware—capable of switching, routing, error checking, and/or managing the one or more packet data or packet labels associated with each wavelength channel 1705. In an embodiment, switching element 1708 can comprise a ring configuration having one or more core router nodes and at least one management node. Although this example implements a ring configuration, switching element 1708 could implement a mesh configuration, a star configuration, or any other configuration without departing from the scope of the present disclosure. In various embodiments, switching element 1708 can operate to process wavelength channels 1705 at processing speeds of, for example, at least 10 gigabits/second (Gb/s), at least 40 Gb/s, at least 100 Gb/s, or at least 160 Gb/s.

In an embodiment, switching element 1708 is configured to route one or more packet data associated with wavelength channels 1705 to an output interface 1710. Output interface 1710 can comprise any optical and/or electrical components including any hardware, software, and/or firmware capable of preparing one or more packet data associated with wavelength channels 1705 for communication from router 1700. In this example, output interface 1710 operates to communicate the one or more packet data from router 1700 to a desired destination through an appropriate wavelength channel 1713.

In an embodiment, each combiner 1714 is configured to combine output wavelength channels 1713 into one or more output optical signals 1715 for communication over a communication links 1716. In an embodiment, combiner 1714 includes, for example, a wavelength division multiplexer. The structure and function of communication link 1716 can be substantially similar to the structure and function of communication link 1702. In this example, communication links 1716 operate to couple router 1700 to other optical and/or electro-optical components.

In this example, the controller 1712 is also capable of at least partially contributing to controlling one or more functionalities associated with router 1700. That is, controller 1712 is not required to be capable of performing the desired functionality alone, but may contribute to the performance of the function as part of a larger routine. Controller 1712 can comprise any communication and/or computational device or devices, including any hardware, software, firmware, or combination thereof.

In an embodiment, in operation, the packet data associated with wavelength channels 1705 are transparent to the processing functions of router 1700. That is, in operation router 1700 does not examine the content of the packet data associated with each wavelength channel 1705. In some cases, router 1700 does examine the contents of one or more packet labels and/or other elements of a frame format associated with wavelength channels 1705. In most cases, router 1700 operates to maintain the packet data associated with wavelength channels 1705 in the optical domain. That is, the packet data associated with each wavelength channel 1705 are not subjected to an optical-to-electrical conversion by router 1700. In some cases, one or more of the packet labels and/or other elements of a frame format associated with wavelength channels 1705 can be subjected to one or more optical-to-electrical and/or electrical-to-optical conversions. In various embodiments, router 1700 may be capable of an aggregate capacity of, for example, at least 5 terabits/second (Tb/s), at least 25 Tb/s, at least 50 Tb/s, or at least 100 Tb/s.

In an embodiment, router 1700 can operate to minimize and/or avoid contention between packet data associated with optical signals 1703 and 1715 and/or wavelength channels 1705 and 1713 within switching element 1708 and/or communication links 1702 and 1716. The term "contention" as used herein refers to a process by which a packet data competes with other packet data for communication over a specific wavelength. In some cases, contention can be minimized by, for example, implementing a ring network architecture or performing wavelength conversion. Minimizing and/or avoiding contention can result in a reduction in the congestion associated with an optical signal wavelength.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for bit loading for optical discrete multi-tone (DMT) transmission or reception, comprising:
   receiving, at a processor, a bit data stream, wherein the bit data stream comprises a plurality of subcarriers;
   assigning, with the processor, a code rate to each of a plurality of forward error correction (FEC) encoders/decoders according to a mapping of a signal-to-noise-ratio (SNR) to a code rate for each of the subcarriers or subcarrier groups, wherein each FEC encoder/decoder corresponds to a respective one of the subcarriers or a respective subcarrier group;
   assigning, with the processor, a modulation format to each subcarrier or each subcarrier group according to a mapping of an SNR for each subcarrier or subcarrier group to a bit number for a corresponding subcarrier or subcarrier group; and
   performing a loading primer, wherein performing the loading primer comprises:
      sorting the subcarriers; and
      iteratively calculating an average SNR for each subcarrier, selecting the code rate and the modulation format for each subcarrier according to a lookup table, and determining a sum of a total number of bits for each subcarrier until the total number of bits determined in an iteration is greater than or equal to the total number of bits determined in a previous iteration.

2. The method of claim 1, wherein the code rates for at least two of the FEC encoder/decoders are different.

3. The method of claim 1, further comprising determining a rate-adaptive (RA) solution to a loading algorithm, wherein determining the RA solution comprises:
   quantizing, for each subcarrier, an SNR to a nearest SNR value in an a loading algorithm tabulation table;
   obtaining a corresponding bit number and code rate for each subcarrier according to the tabulation table; and
   scaling, for each subcarrier, a subcarrier power by a ratio of the SNR before quantization to the SNR after quantization.

4. The method of claim 3, further comprising:
   determining a total power sum over all the subcarriers after quantizing the SNR; and
   scaling each subcarrier power by a constant such that the total power before quantizing the SNR is substantially equal to the total power after quantizing the SNR.

5. The method of claim 1, further comprising determining a margin-adaptive (MA) solution to a loading algorithm, wherein determining the MA solution comprises:
   determining a margin between a data rate provide by the loading primer and a target fixed rate;
   scaling, for each subcarrier, the SNR by the margin;
   quantizing, for each subcarrier, the SNR to a nearest SNR value in a loading algorithm tabulation;
   obtaining a corresponding bit number and code rate for each subcarrier or subcarrier group according to the loading algorithm tabulation;
   determining a total power summing over all subcarriers after quantizing the SNR when an updated data rate is substantially equal to a target data rate; and
   scaling each subcarrier power by a constant such that the total power before quantizing the SNR is substantially equal to the total power after quantizing the SNR.

6. The method of claim 5, further comprising requantizing each subcarrier when the updated data rate is not substantially equal to the target data rate.

7. A network component configured for bit loading for optical discrete multi-tone (DMT) transmission or reception, the network component comprising:
a processor; and
a computer readable storage medium storing programming for execution by the processor, the programming including instructions to:
receive a bit data stream, wherein the bit data stream comprises a plurality of subcarriers;
assign a code rate to each of a plurality of forward error correction (FEC) encoders/decoders according to a mapping of a signal-to-noise-ratio (SNR) to a code rate for each of the subcarriers or subcarrier groups, wherein each FEC encoder/decoder corresponds to a respective one of the subcarriers or a respective subcarrier group;
assign a modulation format to each subcarrier or each subcarrier group according to a mapping of an SNR for each subcarrier or subcarrier group to a bit number for a corresponding subcarrier or subcarrier group; and
execute a loading primer, wherein the instructions to execute the loading primer comprise instructions to:
sort the subcarriers; and
iteratively calculate an average SNR for each subcarrier, select the code rate and the modulation format for each subcarrier according to a lookup table, and determine a sum of a total number of bits for each subcarrier until the total number of bits determined in an iteration is greater than or equal to the total number of bits determined in a previous iteration.

8. The network component of claim 7, wherein the code rates for at least two of the FEC encoder/decoders are different.

9. The network component of claim 7, wherein the programming further comprises instructions to determine a rate-adaptive (RA) solution to a loading algorithm, wherein the instructions to determine the RA solution comprise instructions to:
quantize, for each subcarrier, an SNR to a nearest SNR value in an a loading algorithm tabulation table;
obtain a corresponding bit number and code rate for each subcarrier according to the tabulation table; and
scale, for each subcarrier, a subcarrier power by a ratio of the SNR before quantization to the SNR after quantization.

10. The network component of claim 9, wherein the programming further comprises instructions to:
determine a total power sum over all the subcarriers after quantizing the SNR; and
scale each subcarrier power by a constant such that the total power before quantizing the SNR is substantially equal to the total power after quantizing the SNR.

11. The network component of claim 7, wherein the programming further comprises instructions to determine a margin-adaptive (MA) solution to a loading algorithm, wherein the instructions to determine the MA solution comprise instructions to:
determine a margin between a data rate provide by the loading primer and a target fixed rate;
scale, for each subcarrier, the SNR by the margin;
quantize, for each subcarrier, the SNR to a nearest SNR value in a loading algorithm tabulation;
obtain a corresponding bit number and code rate for each subcarrier or subcarrier group according to the loading algorithm tabulation;
determine a total power summing over all subcarriers after quantizing the SNR when an updated data rate is substantially equal to a target data rate; and
scale each subcarrier power by a constant such that the total power before quantizing the SNR is substantially equal to the total power after quantizing the SNR.

12. The network component of claim 11, wherein the programming further comprises instructions to requantize each subcarrier when the updated data rate is not substantially equal to the target data rate.

13. A method for bit loading for optical discrete multi-tone (DMT) transmission or reception, comprising:
receiving a plurality of data bits comprising a plurality of subcarriers;
mapping a signal-to-noise-ratio (SNR) to a modulation format and a code rate for each subcarrier or group of subcarriers;
performing forward error correction (FEC) on each subcarrier or group of subcarriers according to the code rate corresponding to the subcarrier or group of subcarriers;
jointly optimizing a bit number, code rate, and power for each subcarrier or group of subcarriers according to the SNR for the corresponding subcarrier or group of subcarriers and according to the modulation format; and
performing a loading primer, wherein performing the loading primer comprises:
sorting the subcarriers; and
iteratively calculating an average SNR for each subcarrier, selecting the code rate and the modulation format for each subcarrier according to a lookup table, and determining a sum of a total number of bits for each subcarrier until the total number of bits determined in an iteration is greater than or equal to the total number of bits determined in a previous iteration.

14. The method of claim 13, further comprising determining a rate-adaptive (RA) solution to a loading algorithm, wherein determining the RA solution comprises:
quantizing, for each subcarrier, an SNR to a nearest SNR value in an a loading algorithm tabulation table;
obtaining a corresponding bit number and code rate for each subcarrier according to the tabulation table; and
scaling, for each subcarrier, a subcarrier power by a ratio of the SNR before quantization to the SNR after quantization.

15. The method of claim 14, further comprising:
determining a total power sum over all the subcarriers after quantizing the SNR; and
scaling each subcarrier power by a constant such that the total power before quantizing the SNR is substantially equal to the total power after quantizing the SNR.

16. The method of claim 13, further comprising determining a margin-adaptive (MA) solution to a loading algorithm, wherein determining the MA solution comprises:
determining a margin between a data rate provide by the loading primer and a target fixed rate;
scaling, for each subcarrier, the SNR by the margin;
quantizing, for each subcarrier, the SNR to a nearest SNR value in a loading algorithm tabulation;
obtaining a corresponding bit number and code rate for each subcarrier or subcarrier group according to the loading algorithm tabulation;
determining a total power summing over all subcarriers after quantizing the SNR when an updated data rate is substantially equal to a target data rate; and
scaling each subcarrier power by a constant such that the total power before quantizing the SNR is substantially equal to the total power after quantizing the SNR.

17. The method of claim 16, further comprising requantizing each subcarrier when the updated data rate is not substantially equal to the target data rate.

\* \* \* \* \*